United States Patent
Horikoshi

(10) Patent No.: US 8,032,789 B2
(45) Date of Patent: Oct. 4, 2011

(54) APPARATUS MAINTENANCE SYSTEM AND METHOD

(75) Inventor: Keita Horikoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 206 days.

(21) Appl. No.: 12/407,936

(22) Filed: Mar. 20, 2009

(65) Prior Publication Data

US 2009/0249117 A1    Oct. 1, 2009

(30) Foreign Application Priority Data

Mar. 25, 2008   (JP) ................................ 2008-078576

(51) Int. Cl.
*G06F 11/00* (2006.01)

(52) U.S. Cl. ............................... 714/31; 714/48; 714/25

(58) Field of Classification Search ...................... 714/31
See application file for complete search history.

(56) References Cited

U.S. PATENT DOCUMENTS

| | | | | |
|---|---|---|---|---|
| 4,392,208 | A * | 7/1983 | Burrows et al. ................. | 714/31 |
| 5,386,271 | A | 1/1995 | Maekawa et al. | |
| 5,964,891 | A * | 10/1999 | Caswell et al. ................. | 714/31 |
| 6,145,096 | A * | 11/2000 | Bereiter et al. ................. | 714/25 |
| 6,216,051 | B1 * | 4/2001 | Hager et al. ..................... | 700/82 |
| 6,260,048 | B1 | 7/2001 | Carpenter et al. | |
| 6,477,667 | B1 * | 11/2002 | Levi et al. ....................... | 714/57 |
| 6,523,044 | B1 | 2/2003 | Muramoto et al. | |
| 6,725,405 | B2 * | 4/2004 | Batten et al. ................... | 714/724 |
| 6,738,811 | B1 * | 5/2004 | Liang ............................ | 709/224 |
| 6,892,317 | B1 * | 5/2005 | Sampath et al. ................. | 714/4 |
| 7,302,618 | B1 * | 11/2007 | Shafer et al. ................... | 714/48 |
| 7,308,492 | B2 * | 12/2007 | Konopka et al. ............. | 709/221 |
| 7,386,761 | B2 * | 6/2008 | Abali et al. ..................... | 714/27 |
| 7,395,458 | B2 * | 7/2008 | Shrivastava et al. ........... | 714/47 |
| 7,401,263 | B2 * | 7/2008 | Dubois et al. .................. | 714/47 |
| 7,444,546 | B2 * | 10/2008 | Kimelman et al. ............ | 714/31 |
| 7,617,086 | B2 * | 11/2009 | Okada et al. ................... | 703/21 |
| 7,634,563 | B2 * | 12/2009 | Menard et al. ................ | 709/224 |
| 7,730,020 | B2 * | 6/2010 | Leung et al. .................. | 707/600 |
| 7,774,651 | B2 * | 8/2010 | Mukherjee et al. ............ | 714/26 |
| 2003/0033397 | A1 * | 2/2003 | Gurumoorthy et al. ...... | 709/223 |
| 2003/0140279 | A1 * | 7/2003 | Szucs et al. .................... | 714/31 |
| 2005/0188260 | A1 * | 8/2005 | First et al. ...................... | 714/25 |
| 2007/0288795 | A1 * | 12/2007 | Leung et al. ................... | 714/26 |
| 2008/0104453 | A1 * | 5/2008 | Mukherjee et al. ............ | 714/47 |

(Continued)

FOREIGN PATENT DOCUMENTS

JP         05-61283         3/1993

(Continued)

OTHER PUBLICATIONS

Japanese Office Action No. 2008-078576 dated Dec. 15, 2009.

*Primary Examiner* — Christopher McCarthy

(74) *Attorney, Agent, or Firm* — Staas & Halsey LLP

(57) ABSTRACT

An apparatus maintenance system and method are provided. The apparatus maintenance system includes an apparatus including a first control part, and a second control part connected to the first control part and a maintenance-data management server managing maintenance data about the apparatus. The second control part downloads the maintenance data from the maintenance-data management server to transfer the downloaded maintenance data to the first control part and transmits a maintenance result transferred from the first control part to the maintenance-data management server.

8 Claims, 10 Drawing Sheets

U.S. PATENT DOCUMENTS

| | | | |
|---|---|---|---|
| 2008/0263398 A1* | 10/2008 | Mori et al. | 714/25 |
| 2009/0024872 A1* | 1/2009 | Beverly | 714/25 |
| 2009/0193298 A1* | 7/2009 | Mukherjee | 714/38 |

FOREIGN PATENT DOCUMENTS

| | | |
|---|---|---|
| JP | 8-87423 | 4/1996 |
| JP | 11-184874 | 7/1999 |
| JP | 2000-57226 | 2/2000 |
| JP | 2000-137627 | 5/2000 |
| JP | 2001-109704 | 4/2001 |
| JP | 2001-338025 | 12/2001 |
| JP | 2002-83118 | 3/2002 |
| JP | 2002-109138 | 4/2002 |
| JP | 2003-271422 | 9/2003 |
| JP | 2004-21942 | 1/2004 |
| JP | 2004-38535 | 2/2004 |
| JP | 2004-86719 | 3/2004 |

* cited by examiner

FIG. 3

| MATERIAL NO. | CLASSIFICATION | KEYWORD | TARGET DB NO. | LOCATION |
|---|---|---|---|---|
| 1 | FAILURE ANALYSIS | DDR, MEMORY | A1, C2 | http://.../ |
| 2 | FAILURE REPORT | MEMORY | A2, B2 | http://.../ |
| 3 | QUALITY DATA | HDD | ALL | http://.../ |
| ... | | | | |

APPARATUS MAINTENANCE SYSTEM AND METHOD

CROSS REFERENCES TO RELATED APPLICATION(S)

This application is related to and claims priority to Japanese patent application no. 2008-078576 filed on Mar. 25, 2008 in the Japan Patent Office, and incorporated by reference herein.

FIELD

The embodiments discussed herein are related to an apparatus maintenance system and method for maintenance of a failure occurring in an apparatus.

BACKGROUND

In general, various problems including defects, faults, and errors may be resolved as they occur in planning and development, manufacturing, or operation at customers' sites of products or apparatuses. The problems of products include faulty designs in development departments, initial faults or faulty lots in manufacturing factories, and faults specific to customers' environments and aging at the fields of the customers. Although the problems may be resolved at the places where the problems occur, solutions for the problems and the know-how of solutions may not have been shared between the customers or sites. Accordingly, if problems known in factories occur at customers' sites, it can take a long time to resolve the problems because persons-in-charge at the customers' sites, for example, cannot find appropriate maintenance procedures. In addition, support staffs who have received questions regarding a product or problem may offer the wrong solution.

Apparatuses controlled by using firmware may be monitored by remote maintenance centers connected via networks. However, persons-in-charge cannot resolve problems occurring in the apparatuses because latest maintenance data, for example, may not be compiled in the apparatus.

For example, the following solutions are proposed in related art. Japanese Laid-Open Patent Application Publication No. 5-61283 discloses a system in which data about copiers is automatically collected and a center manages the collected data and automatically outputs an operation guideline. Also, Japanese Laid-Open Patent Application Publication No. 2002-83118 discloses an information acquiring tool for acquiring detailed information useful for analysis of faults in electric products has been proposed. The information acquiring tool is carried by a maintenance service staff and is used in a system in which fault diagnosis information used for identifying a faulty circuit in an electric product connected to a network is transmitted from each door and a maintenance-repair service center managing customer information and product information diagnoses the fault in the electric product. Also, Japanese Laid-Open Patent Application Publication No. 2002-109138 discloses centralized control of quality defects occurring in a series of life processes including development and design of products, manufacturing and shipment of the products, and distribution of the products in the markets. Japanese Laid-Open Patent Application Publication No. 2004-21942 discloses a method of managing knowledge information in a knowledge information network, which is an information communication network connecting multiple departments. In this method, a contact center referring to a reference database that is build to make use of registered knowledge and information is provided on the information communication network.

SUMMARY

It is an aspect of an embodiment discussed herein to provide an apparatus maintenance system including an apparatus including a first control part, and a second control part connected to the first control part and a maintenance-data management server managing maintenance data about the apparatus. The second control part downloads the maintenance data from the maintenance-data management server to transfer the downloaded maintenance data to the first control part and transmits a maintenance result transferred from the first control part to the maintenance-data management server.

It is another aspect of an embodiment discussed herein to provide a maintenance method for a system including an apparatus that includes a first control part and a second control part connected to the first control part and a maintenance-data management server that manages maintenance data about the apparatus including downloading the maintenance data from the maintenance-data management server to transfer the downloaded maintenance data to the first control part from the second control part, generating a maintenance procedure on the basis of the transferred maintenance data, transferring a maintenance result to the second control part after the maintenance from the first control part, and transmitting the transferred maintenance result to the maintenance-data management server from the second control part.

It is another aspect of an embodiment discussed herein to provide a maintenance method performed by a processor including downloading maintenance data from a server, transferring the maintenance data to a first controller from a second controller, generating a maintenance procedure on a basis of the transferred maintenance data, transferring a maintenance result to the second controller after the maintenance from the first controller; and transmitting the transferred result to the server from the second controller.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 illustrates an exemplary sub-table in which a variety of data stored in a maintenance database is registered;

DETAILED DESCRIPTION OF THE EMBODIMENTS

Figure 1:
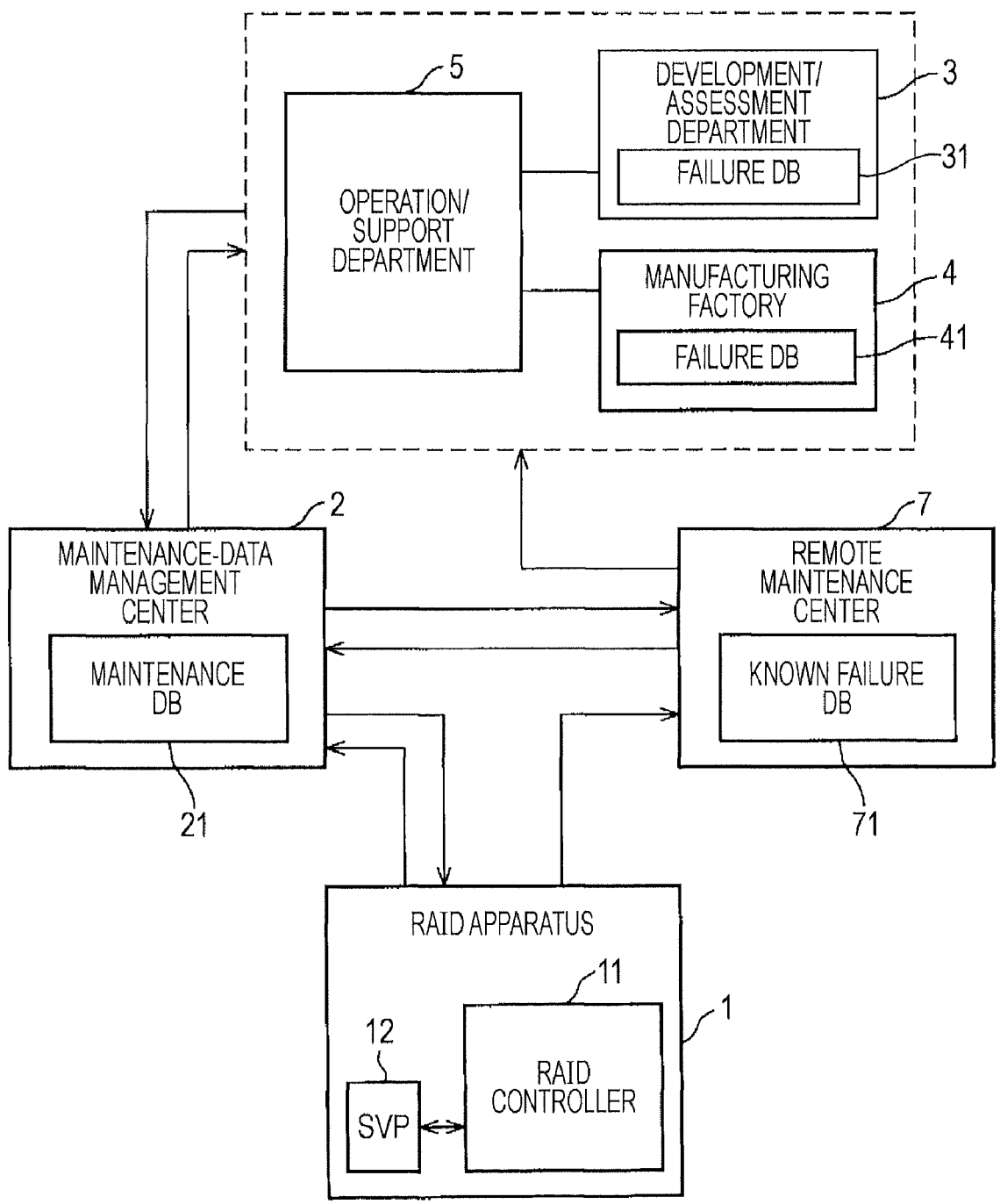
FIG. 1 illustrates an exemplary apparatus maintenance system according to an embodiment.

FIG. 1 illustrates an exemplary apparatus maintenance system 10 according to an embodiment.

In the apparatus maintenance system 10, an exemplary Redundant Arrays of Inexpensive (or Independent) Disks (RAID) apparatus 1 is targeted for monitoring and maintenance. The RAID apparatus 1 is a disk array apparatus in which multiple hard disks may be arranged. The RAID apparatus 1 operates with high reliability because of its redundant configuration. The RAID apparatus 1 includes a RAID controller 11 controlling the entire RAID apparatus 1 and a service processor (SVP) 12 operating independently of the RAID apparatus 1. The service processor 12 may be connected to the apparatus maintenance system 10 via a communication network, such as the Internet.

Multiple RAID apparatuses may be connected to the apparatus maintenance system 10, and each of the RAID apparatuses may be targeted for the monitoring and the maintenance by the apparatus maintenance system 10. Referring to FIG. 1, one of the multiple RAID apparatuses is illustrated as the RAID apparatus 1. The RAID apparatus targeted for the maintenance is only an example and the RAID apparatus may be applied to a server or a home electric appliance as long as the server or home electric appliance is controlled by, for example, a central processing unit (CPU) or micro processing unit (MPU).

A maintenance-data management center 2, which is a server, may perform centralized management of failure and the solutions of the failures occurring in research and development, manufacturing, and operation of the RAID apparatus 1. The maintenance-data management center 2 includes a maintenance database 21 storing suspected parts that any failure may have occurred, maintenance procedures, and various reports. The data in the maintenance database 21 may be registered or updated on time. The maintenance-data management center 2 may be connected to a development/assessment department 3 developing the RAID apparatus 1, a manufacturing factory 4 manufacturing the RAID apparatus 1, and an operation/support department 5 involved in the support of the RAID apparatus 1 over the Internet.

The development/assessment department 3 and the manufacturing factory 4 include a failure database 31 and a failure database 41, respectively. Data about failures occurring in the corresponding department may be stored in the failure database 31 and the failure database 4. If a failure occurs in the development/assessment department 3 or the manufacturing factory 4, the failure data may be stored in the failure database 31 or the failure database 41. The operation/support department 5 may be notified of the failure data and the failure data may be collected in the operation/support department 5.

The operation/support department 5 may register the collected failure data in the maintenance database 21 in the maintenance-data management center 2. If the failure is recovered, the operation/support department 5 may register the cause of the failure, a solution procedure such as a part exchange procedure, related information, and reference data, etc. in the maintenance database 21.

A remote maintenance center 7, which is a server, may be connected to the RAID apparatus 1 over the Internet to constantly monitor the RAID apparatus 1. The remote maintenance center 7 may be connected to the maintenance-data management center 2 over the Internet and includes a known failure database 71. The data in the known failure database 71 may be updated with known failure data that shows known failure received from the maintenance-data management center 2. The remote maintenance center 7 may transmit connection information about all the RAID apparatuses connected to the apparatus maintenance system 10 to the maintenance-data management center 2. The connection information includes the types of the RAID apparatuses and the places where the RAID apparatuses are installed.

Although the remote maintenance center 7 may be separated from the maintenance-data management center 2 in the example in FIG. 1, the remote maintenance center 7 may be integrated with the maintenance-data management center 2.

Figure 2:
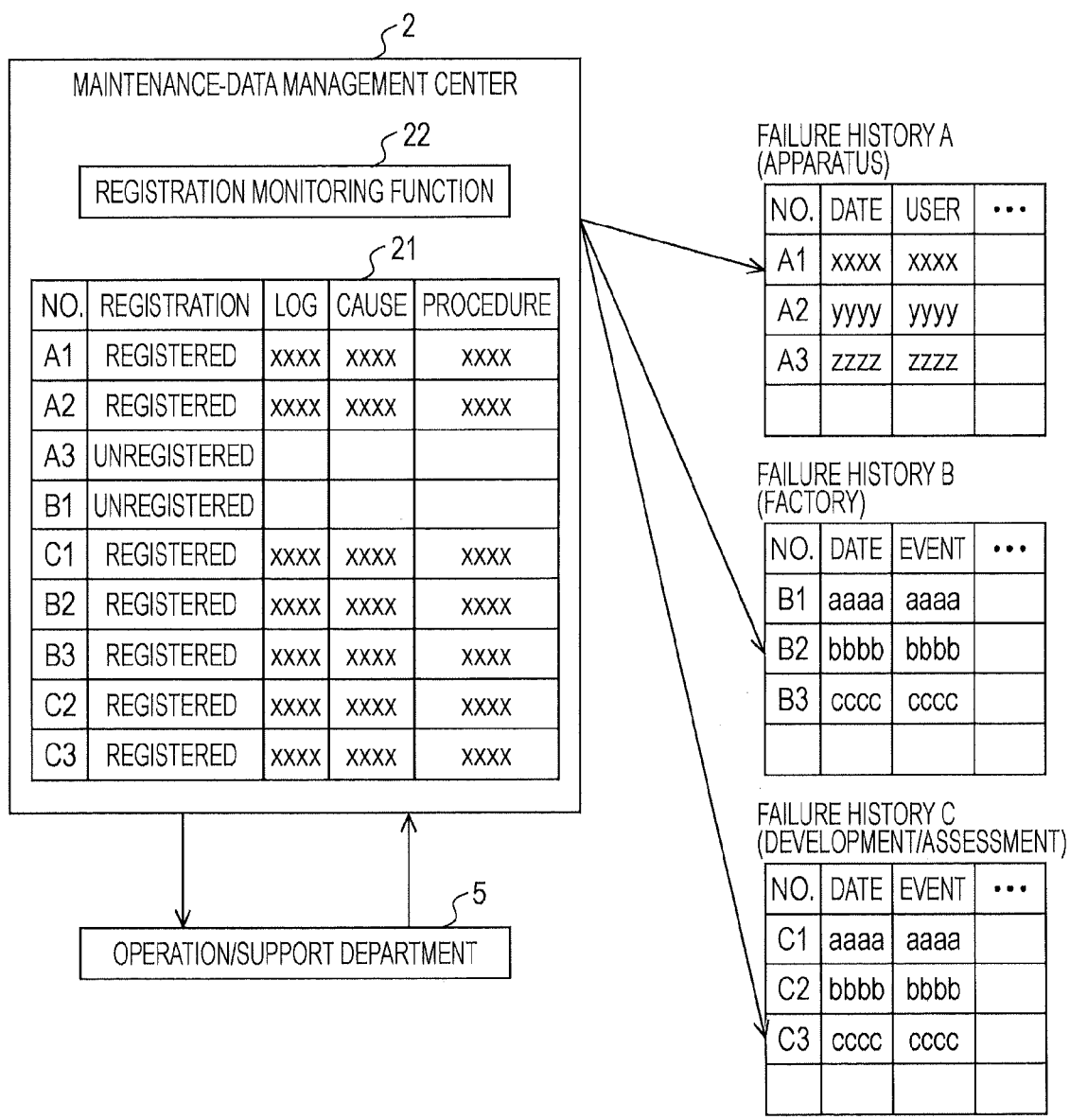
FIG. 2 illustrates exemplary registration monitoring of a maintenance-data management center.

FIG. 2 illustrates an exemplary registration monitoring of a maintenance-data management center 2.

The maintenance-data management center 2 may have a registration monitoring function 22 that prevents a failure that has occurred and the result of a maintenance operation from not being registered. As described above, a failure may be registered in the database at the place where the failure has occurred and the maintenance-data management center 2 may be notified of the occurrence of the failure. The registration-monitoring function 22 monitors update of a failure history stored in each failure database and additionally may register the updated failure history in the maintenance database 21 if the failure history is updated. In addition, if the cause, the maintenance procedure, etc, of a failure that has occurred are not registered in the maintenance database 21, the registration-monitoring function 22 may urge the operation/support department 5 to register them. In an apparatus like the RAID apparatus 1, the cause, the maintenance procedure, etc. of a known failure may be registered by the service processor 12 while the cause, the maintenance procedure, etc. of an unknown failure is registered through the operation/support department 5 because no reference data about the unknown failure may be present.

Referring to FIG. 2, a failure history A may be registered by a maintenance staff in an apparatus like the RAID apparatus 1 or at a field. The failure history A may be stored in an operation history database of the maintenance staff. A failure history B may be stored in the failure database 41 in the manufacturing factory 4. A failure history C may be stored in the failure database 31 in the development/assessment department 3.

The key number ("NO." in FIG. 2) of each failure, the date and time when the failure occurs, a user name, a failure event, and so on may be recorded in each of the failure histories A to C. The maintenance-data management center 2 monitors the failure histories A to C and may register data about any key number that may be added in the maintenance database 21.

The operation/support department 5 may register maintenance data about an unknown failure that has occurred in the maintenance database 21 using an e-mail or a Web form. The maintenance data includes log information used for identifying the cause of the failure, and the failure recovery procedure.

The registration monitoring function 22 urges the operation/support department 5 to register data about an unregistered result of the maintenance operation of an unknown failure periodically, for example, every day. The urge of the registration can prevent the result of the maintenance operation for a failure that has occurred from not being registered in the maintenance database 21.

The maintenance-data management center 2 may distribute statistics or analysis results of failures that have occurred and the recovery procedures of the failures to each related place, for example, for every week on the basis of the operation results transmitted from the operation/support department 5.

FIG. 3 illustrates an exemplary sub-table in which a variety of data stored in maintenance database may be registered.

Technical data including quality information about faulty parts, the result of a failure analysis, a failure report to a customer may be useful for the maintenance and support operations. Such technical data may be registered in a sub-table 211 in the maintenance database 21 in the maintenance-data management center 2.

In the sub-table 211 in FIG. 3, a material number may be given to each material. A classification used for search for each material, a keyword, the number(s) of a maintenance database (maintenance databases) for which the material may be prepared, and the address where the material may be stored may be stored in the sub-table 211. The sub-table 211 may be linked to the maintenance database(s) of the corresponding number(s) on the basis of the number(s) of the target maintenance database(s) in the sub-table 211.

In the maintenance operation of the RAID apparatus 1, if the failure event or the faulty part is known, links to relate material may also displayed, in addition to the maintenance procedure and the suspected parts. Accordingly, it may be not necessary for the maintenance staff to search the materials by using, for example, the keywords. Since the maintenance staff of the RAID apparatus 1 can obtain the data from the maintenance-data management center 2 on site, the maintenance staff of the RAID apparatus 1 can rapidly deliver the report to the customer. In addition, the maintenance staff can obtain the data on the basis of the number of the maintenance database or the keyword in the report to the operation department.

Since the maintenance staff can also obtain the quality data, the maintenance staff can monitor any shift between the entire quality of the apparatuses and the quality of the apparatus which the maintenance staff is in charge of and, therefore, can accurately present problems from the site to the operation department.

Figure 4:
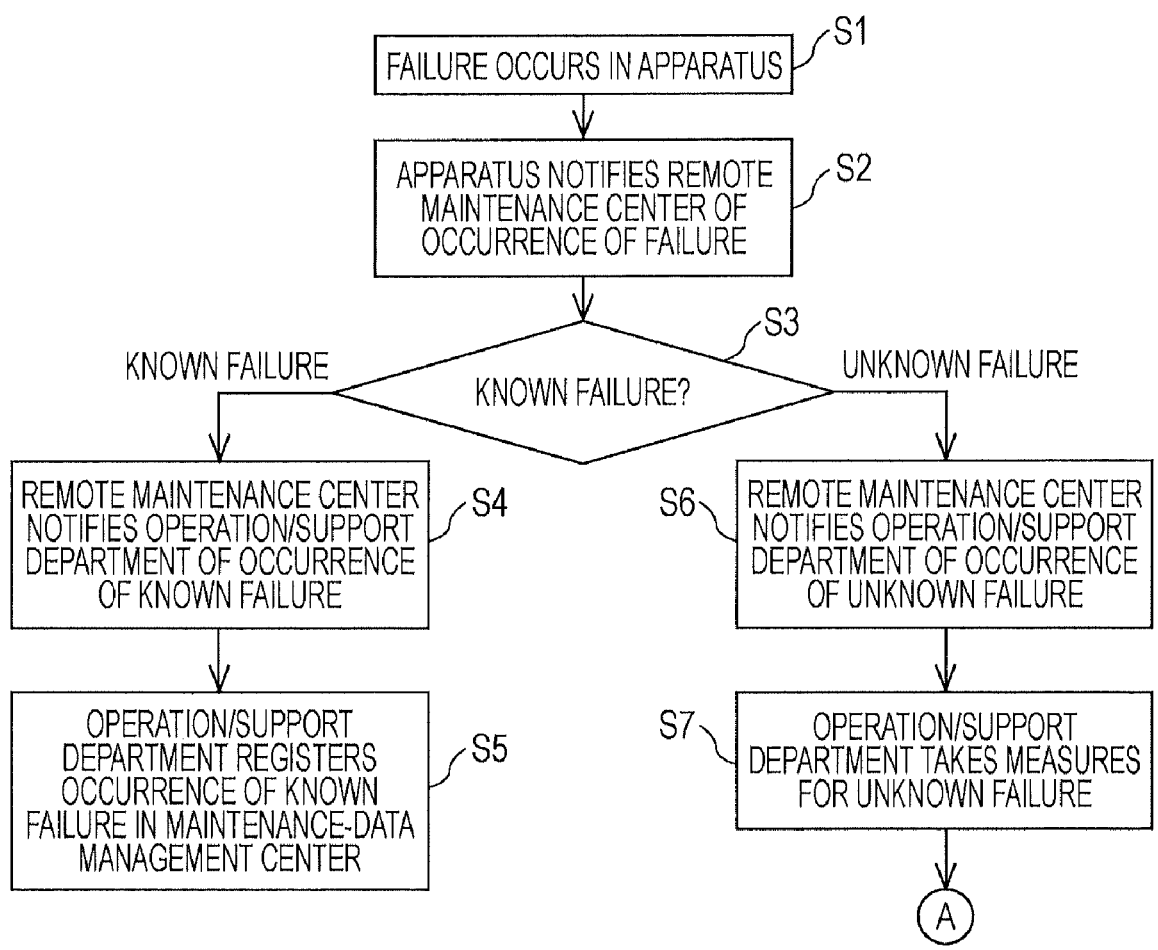
FIG. 4 illustrates an exemplary operation of the apparatus maintenance system according to an embodiment.
Figure 5:
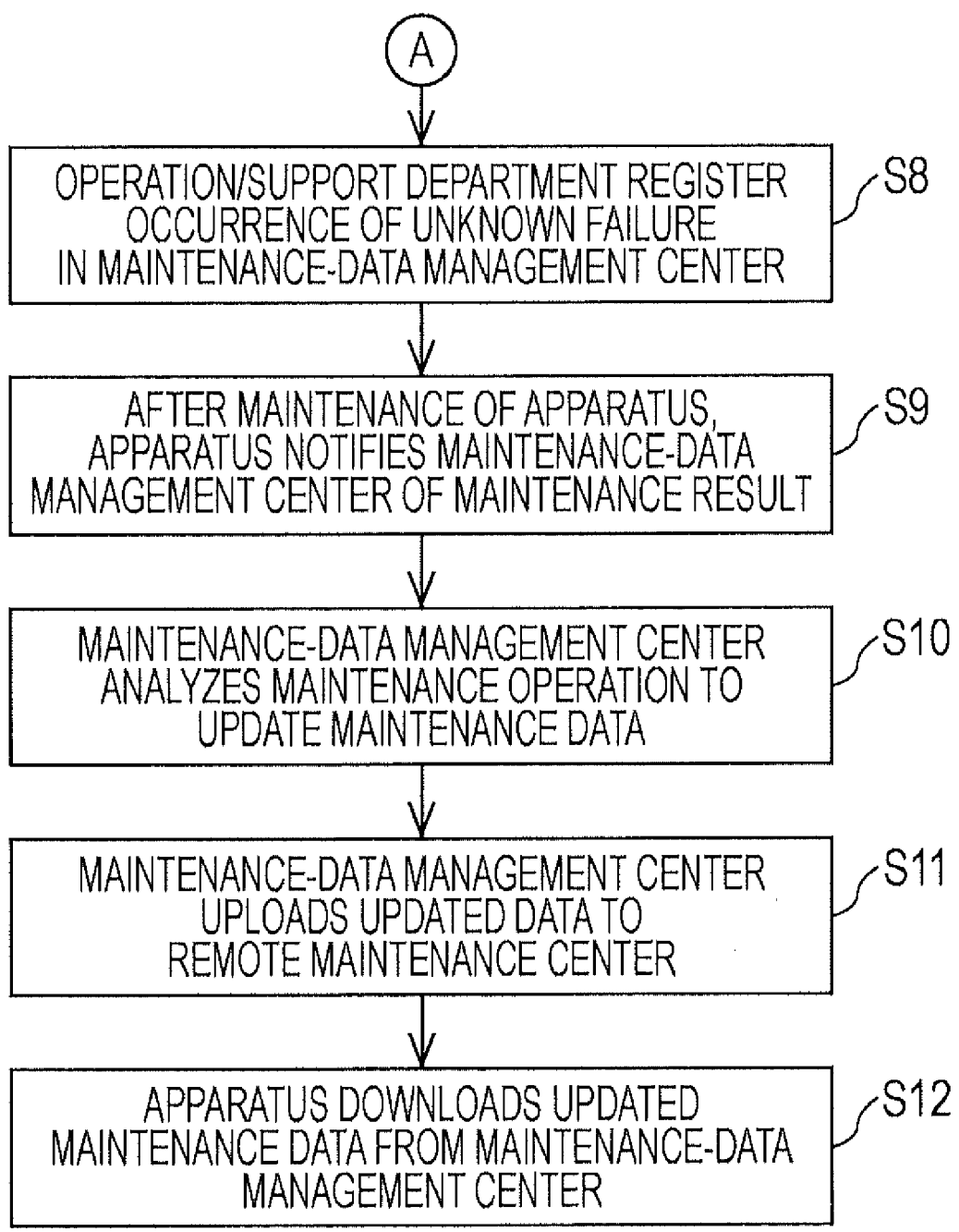
FIG. 5 illustrates an exemplary operation of the apparatus maintenance system according to an embodiment.

FIGS. 4 and 5 illustrate an exemplary operation of a apparatus maintenance system 10.

Referring to FIG. 4, if a failure occurs in the RAID apparatus 1 in Operation S1, then in Operation S2, the RAID apparatus 1 notifies the remote maintenance center 7 of the occurrence of the failure. In Operation S3, the remote maintenance center 7 compares the failure notified by the RAID apparatus 1 with the data stored in the known failure database 71. If the same event as the failure that has occurred is found in the known failure database 71, the remote maintenance center 7 determines that the failure that has occurred is a known failure and, then in Operation S4, notifies the operation/support department 5 of the occurrence of the known failure. Since the maintenance staff of the RAID apparatus 1 can appropriately respond to the failure upon the failure that has occurred being a known failure, the operation/support department 5 does not take special measures, for example, dispatch of a support staff. In Operation S5, the operation/support department 5 may register the occurrence of the known failure in the maintenance-data management center 2.

If the failure that has occurred in the RAID apparatus 1 does not match with any known failure stored in the maintenance database 21 as the result of the comparison in Operation S3, the remote maintenance center 7 determines that the failure that has occurred is a unknown failure and, then in Operation S6, notifies the operation/support department 5 of the occurrence of the unknown failure. In Operation S7, the operation/support department 5 causes an operation staff or a support staff to rush to the scene and to take measures, for example, to recover the failure together with the maintenance staff on site. Referring to FIG. 5, in Operation S8, the operation/support department 5 may register the occurrence of the unknown failure in the maintenance-data management center 2. The operation department and the support department may take action together, or the support department may first take action and the operation department may take action if the support department cannot recover the failure.

After the maintenance operation for the unknown failure is performed, then in Operation S9, the RAID apparatus 1 notifies the maintenance-data management center 2 of the maintenance operation and the result of the maintenance operation. Specifically, the RAID apparatus 1 notifies the maintenance-data management center 2 of whether the maintenance operation succeeds.

The maintenance-data management center 2 counts the success or failure of the maintenance operation for each failure that has occurred and stores the counts of the success and the failure as statistical information. Accordingly, the maintenance-data management center 2 is capable of analyzing the maintenance operation and the result of the maintenance operation notified by the RAID apparatus 1 in conjunction with other data that is registered. The result of the analysis is used for, for example, selection of a maintenance operation upon a similar failure occurs. For example, the priorities of the maintenance operations having higher success counts may be increased and the maintenance procedure having the highest priority may be set as the optimal procedure. In Operation S10, the maintenance-data management center 2 updates the maintenance database 21 if the analysis shows that the maintenance procedure or the suspected parts are changed.

After the maintenance database 21 is updated, in Operation S11, the maintenance-data management center 2 uploads the updated data to the remote maintenance center 7 and the known failure database 71 in the remote maintenance center 7 may be updated. As a result, the known failure database 71 may be kept up-to-date.

In Operation S12, the RAID apparatus 1 periodically downloads the updated maintenance data from the maintenance-data management center 2 to keep the maintenance information in the RAID apparatus 1 up-to-date.

If an unknown failure is recovered and new maintenance data is generated, the maintenance-data management center 2 may concurrently distribute the maintenance data to all the apparatuses connected to the system on the basis of the data about the connected apparatuses acquired from the remote maintenance center 7 because of its emergency state.

Figure 6:
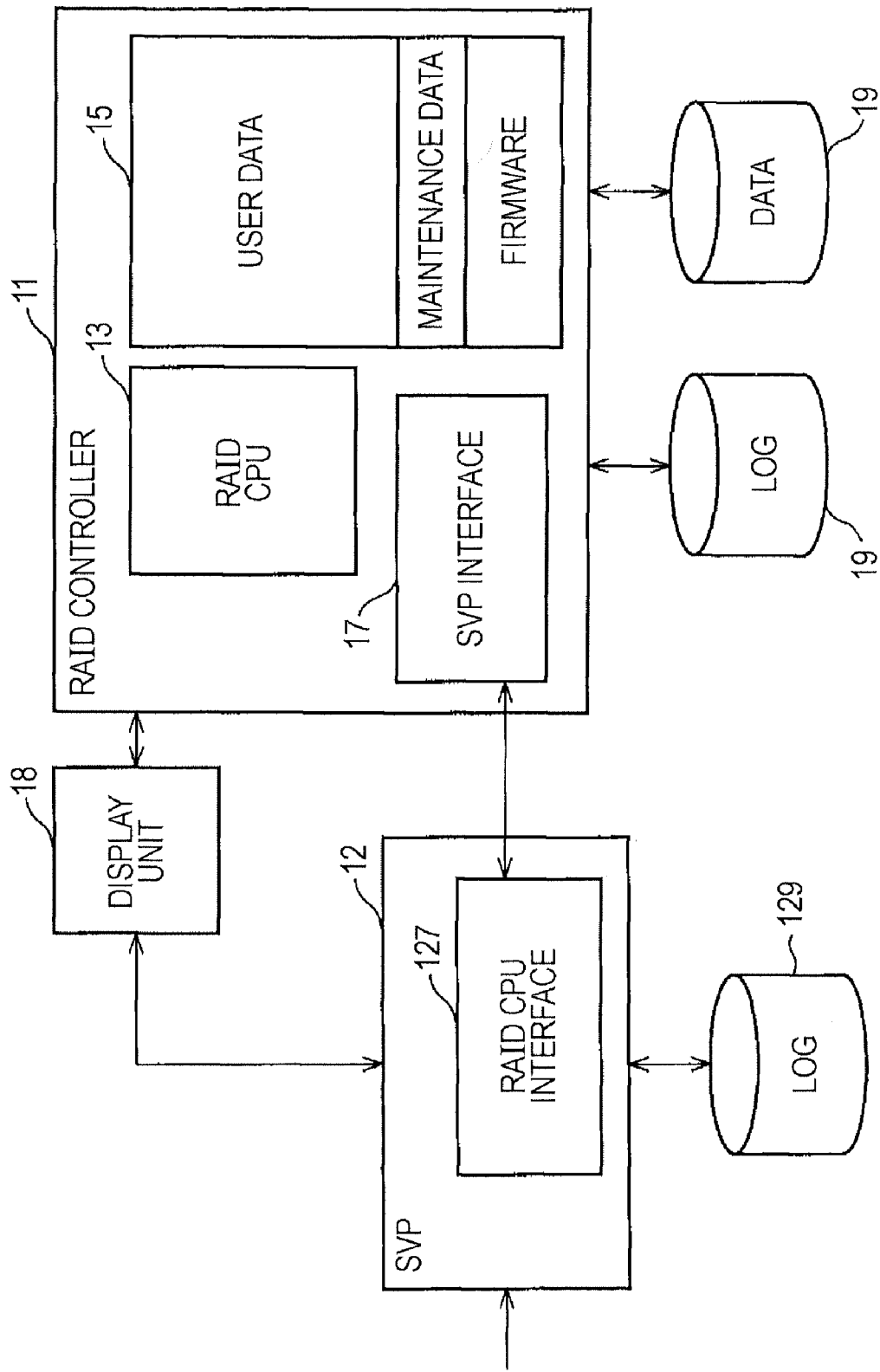
FIG. 6 illustrates a relationship between a RAID controller and a service processor in a RAID apparatus.

FIG. 6 illustrates an exemplary e relationship between the RAID controller 11 and the service processor 12 in the RAID apparatus 1. The service processor 12 operates independently of the RAID apparatus 1. The service processor 12 may be connected to the maintenance-data management center 2 and the remote maintenance center 7 over the Internet (refer to FIG. 1) and may be connected to the RAID controller 11 via a RAID CPU interface 127. The service processor 12 includes a hard disk 129 storing a log.

The RAID controller 11 controlling the RAID apparatus 1 includes a RAID CPU 13 mounted on a board, a main memory 15, and an SVP interface 17 for communication with the service processor 12. The main memory 15 stores firmware controlling the RAID apparatus 1, maintenance data used for maintenance of the RAID apparatus 1, and user data used for applications and so on. The RAID controller 11 may be connected to the service processor 12 via the SVP interface 17.

The RAID controller 11 may be connected to hard disks 19 in which data and a log may be recorded and accesses the data and the log stored in the hard disks 19 with the RAID CPU 13. The log is a record of the processing in the RAID apparatus 1 and may be referred to for search for the cause of a failure. Since the log may be recorded in the hard disk 19, it is possible to keep the log for a long time without considering the capacity. Although the hard disk storing the data may be separated from the hard disk storing the log in FIG. 6, the data and the log may be stored in a single hard disk.

The RAID apparatus 1 may be provided with a display unit 18. The cause of a failure, the maintenance procedure, and/or the result of analysis of the log in the RAID controller 11 or the service processor 12 can be displayed in the display unit 18. The display unit 18 may be a console or a maintenance terminal of the RAID apparatus 1 or may be a screen of a mobile terminal, such as a mobile phone, of the support staff.

Figure 7:
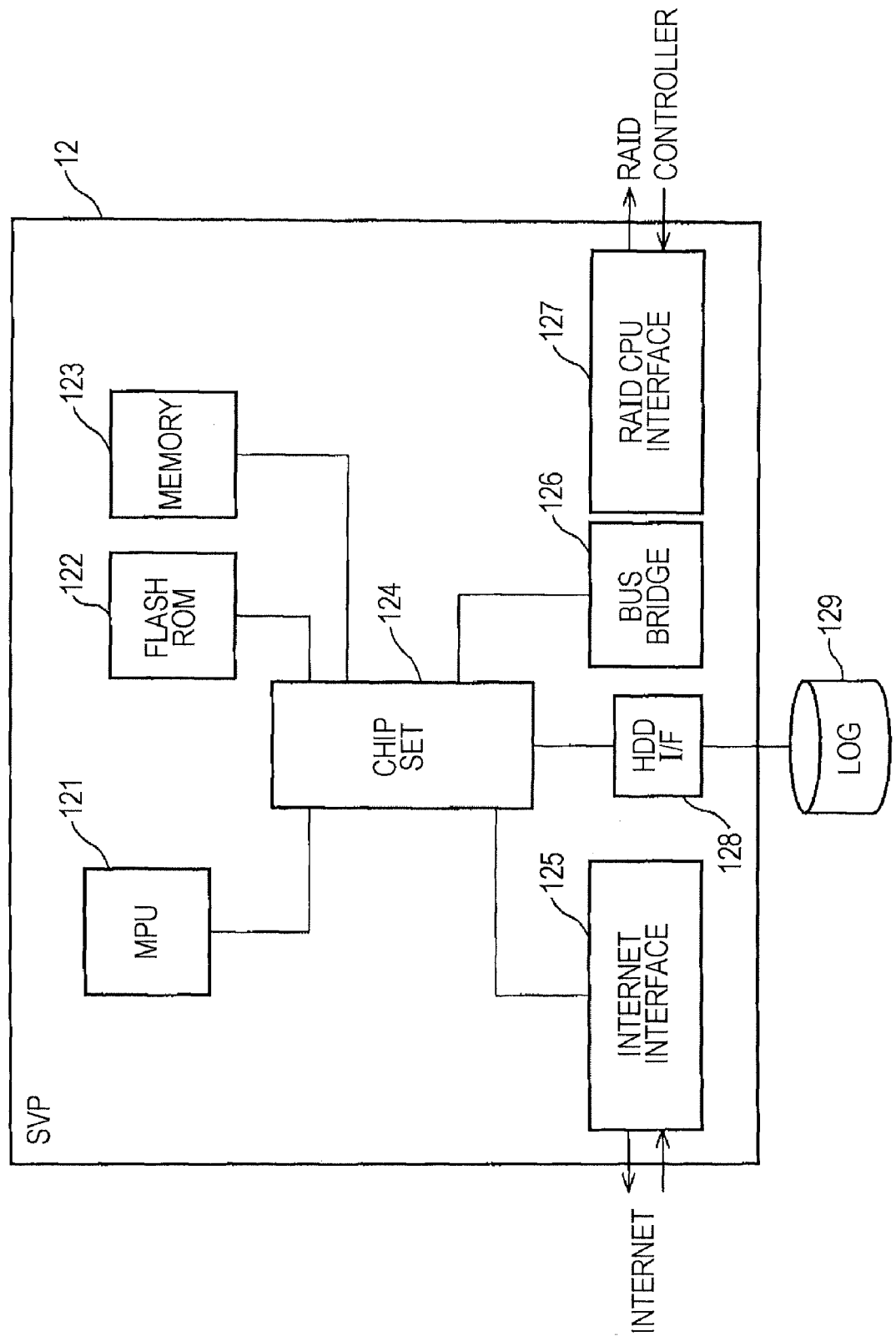
FIG. 7 illustrates an exemplary service processor.

FIG. 7 illustrates an exemplary service processor 12. A micro processor (MPU) 121, which is a control element of the service processor 12, is connected to a flash read only memory (ROM) 122 and a memory 123 via a chip set 124 managing data between the elements composing the service processor 12. The chip set 124 may be connected to an Internet interface 125 and may be also connected to the RAID CPU interface 127 via a bus bridge 126. The chip set 124 may be further connected to the hard disk 129 storing the log via a hard disk drive interface 128.

The service processor 12 may be connected to the Internet via the Internet interface 125 and capable of transmitting and receiving data to and from the maintenance-data management center 2 and the remote maintenance center 7 over the Internet. The service processor 12 may be capable of transmitting and receiving data to and from the RAID controller 11 via the RAID CPU interface 127.

Firmware for the service processor 12 may be stored in the flash ROM 122 in the service processor 12. The memory 123 may stores data used for operating the firmware for the service processor 12. The memory 123 may operate as a cache of data transferred between the service processor 12 and the RAID CPU 13 and also operates as a buffer of data received from the maintenance-data management center 2. The log in the RAID controller 11 may be transferred to the hard disk 129 via the RAID CPU interface 127 and the hard disk drive interface 128 and may be stored in the hard disk 129. Accordingly, even if the RAID controller 11 is down, the log immediately before the RAID controller 11 is down may be stored in the hard disk 129. The service processor 12 operates independently of the RAID apparatus 1, so that it is possible to analyze the log of the RAID apparatus 1 that is down.

Figure 8:
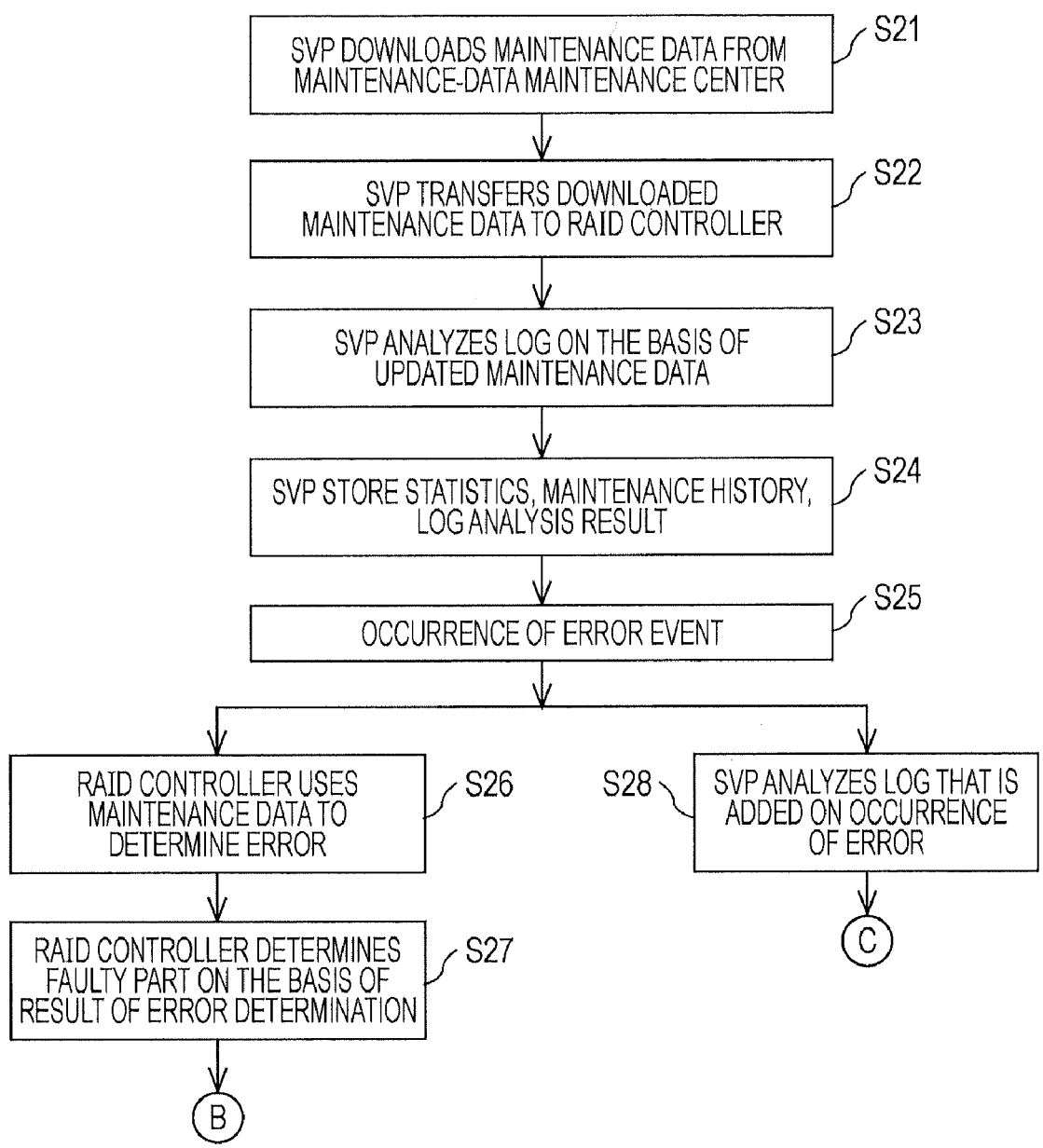
FIG. 8 illustrates an exemplary operation of the service processor and the RAID controller.
Figure 9:
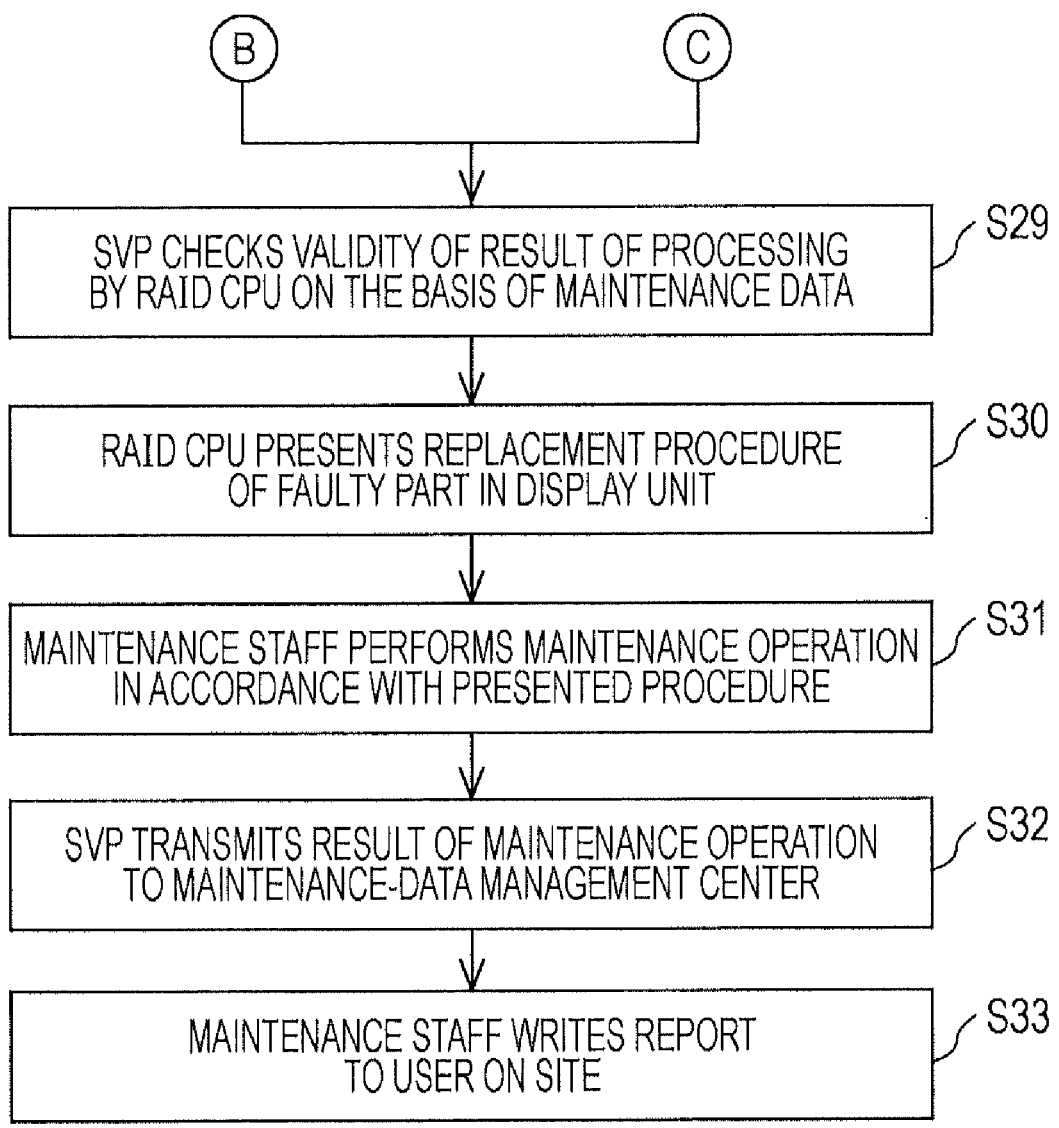
FIG. 9 illustrates and exemplary service processor and the RAID controller.

FIGS. 8 and 9 illustrate an exemplary process upon a failure occurring in the RAID apparatus 1 is recovered by the RAID apparatus 1.

Referring to FIG. 8, the service processor 12 may periodically accesses the maintenance-data management center 2 to determine whether the maintenance data is added or updated. If the service processor 12 determines that the maintenance data is added or updated, in Operation S21, the service processor 12 downloads the added or updated data, that is, difference data of the maintenance data from the maintenance-data management center 2 to the memory 123.

The maintenance data that is downloaded may include failure mode data and failure element data resulting from diagnosis of a faulty product in the operation department or the factory. The maintenance data that is downloaded also includes failure mode data and failure element data concerning failures occurring in the RAID apparatus 1 and other RAID apparatuses connected to the apparatus maintenance system 10. In addition, also if a weight of a failure concerning failure detection logic or a threshold value used in failure determination is updated, such data may be downloaded as the maintenance data.

The service processor 12 may write any maintenance data only for the service processor 12, such as control data for the service processor 12, in the flash ROM 122, after the maintenance data is downloaded.

Upon processing in the service processor 12 being completed, in Operation S22, the service processor 12 transfers the downloaded maintenance data to the RAID controller 11 via the RAID CPU interface 127.

Since the transferred maintenance data may not affect the RAID processing, the transferred maintenance data may be extracted in the maintenance data area in the main memory 15 in the RAID controller 11 with the RAID controller 11 being active. Even if an error determination logic is changed, the maintenance data may be extracted in the maintenance data area and functions. Since an error processing logic can be updated while the RAID apparatus 1 is operating because of the transfer of the maintenance data, it is possible to constantly use the latest error processing logic. If old data becomes unnecessary, the area of the old data is used as the user data area.

In Operation S23, the service processor 12 analyzes the log of the RAID controller 11 transferred to the hard disk 129 on the basis of a log analysis logic downloaded as the maintenance data. In Operation S24, the service processor 12 stores the statistics and the maintenance history resulting from the log analysis and the result of the log analysis in the hard disk 129.

If an error event occurs in Operation S25, then in Operation S26, the firmware in the RAID controller 11 calls an event processing function in the maintenance data area in the main memory 15 and the RAID controller 11 determines the error on the basis of a new error processing logic to obtain a primary processing result.

The downloaded maintenance data includes the failure mode data and the failure element data about all the failures that have occurred. Accordingly, if the failure occurring in the RAID apparatus 1 is a known failure, in Operation S27, the RAID controller 11 determines a faulty part on the basis of the primary processing result. The faulty element may indicate a faulty electronic element included in the part and the faulty part may indicate a faulty module including the element.

In Operation S28, the service processor 12 analyzes the log that may be added on occurrence of the error. Referring to FIG. 9, in Operation S29, the service processor 12 checks the validity of the primary processing result by the RAID CPU 13 on the basis of the result of the log analysis and the maintenance data. The check of the validity can complement the determination result by the RAID CPU 13 to increase the accuracy.

After the faulty part is identified, then in Operation S30, the RAID CPU 13 outputs a replacement procedure on the basis of the maintenance data and presents the replacement procedure in the display unit 18. In Operation S31, the maintenance staff of the RAID apparatus 1 performs the optimal maintenance operation in accordance with the procedure displayed in the display unit 18.

If it is determined that the redundancy and the reliability of the apparatus are sufficiently high on the basis of the system configuration information and the critical level of the failure about the identified failure mode and failure element, the RAID CPU 13 determines that there is no need for the maintenance while the RAID apparatus 1 is active and also presents a maintenance procedure after the RAID apparatus 1 may be stopped in the display unit 18 as one of the choices The maintenance staff may select the maintenance procedure after the RAID apparatus 1 is stopped, which has a low risk of affecting the RAID apparatus 1.

Upon the maintenance operation being completed, the result of the error determination, such as an error severity indicating the severity of the error or a statistic adding point resulting from addition of the weight corresponding to the error, is returned to the firmware. In addition, the RAID controller 11 transmits the result of maintenance operation, including the success or failure of the maintenance operation, to the service processor 12. In Operation S32, the service processor 12 notifies the maintenance-data management center 2 of the result of the maintenance operation as feedback information.

Since the faulty element can be identified by using the latest maintenance data and the related data can be referred to in the apparatus maintenance system 10, there is no need to wait for later discussion. Accordingly, in Operation S33, the maintenance staff writes an initial report to the user on site.

Figure 10:
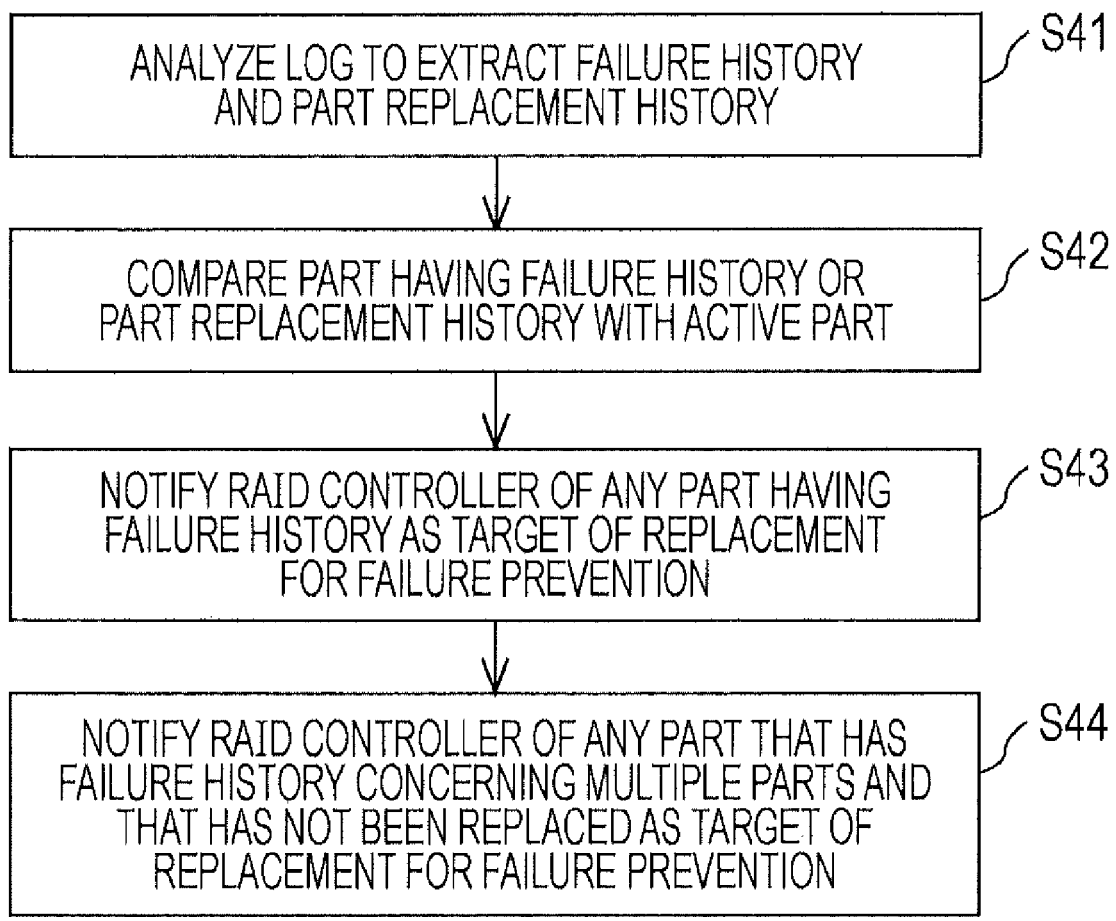
FIG. 10 illustrates an exemplary normal log analysis process by the service processor.

FIG. 10 illustrates an exemplary normal log analysis process by the service processor The service processor 12 independent of the RAID apparatus 1 can refer to the latest maintenance data that is downloaded while the RAID apparatus 1 is operating to analyze the internal log of the RAID apparatus 1.

Referring to FIG. 10, in Operation S41, the service processor 12 analyzes the log held in the hard disk 129 while the RAID apparatus 1 is normally operating to extract the failure history and the part replacement history.

In Operation S42, the service processor 12 compares the part having the extracted failure history or part replacement history with the active part. If a part having the failure history or a part that has not been replaced for a predetermined time period is found, then in Operation S43, the service processor 12 notifies the RAID controller 11 of the part having the failure history or the part that has not been replaced for a predetermined time period as a target of replacement for failure prevention.

In Operation S44, the service processor 12 notifies the RAID controller 11 of any part that has the failure history concerning multiple parts and that has not been replaced as a target of replacement for failure prevention.

According to an embodiment, it is possible to use the maintenance data that is downloaded to easily identify the failure mode and the failure element concerning a failure known to the development department or the manufacturing factory even if the failure is new for the apparatus of a customer. In addition, even in a maintenance procedure that is difficult to be compiled in a manual, the replacement procedure of a faulty part can be output in the console or the maintenance terminal of the apparatus or in the mobile terminal of the maintenance staff, like a maintenance procedure that is compiled in a manual. Accordingly, the maintenance staff can perform the maintenance operation in accordance with the optimal procedure.

Since the service processor independent of the apparatus can refer to the latest maintenance data to analyze the internal log of the apparatus, it is possible to accurately predict and analyze a failure in a normal condition. Even if the RAID apparatus is down and the error processing by the RAID CPU is not performed, the service processor can analyze the log to identify the faulty part. Since the log may be stored in the hard disk, the log can be accumulated for a long time.

Since the apparatus diagnoses the data that is downloaded, instead of inquiring of the center over the Internet or via another communication line to identify the faulty part, it is possible to offer rapid response.

In the apparatus maintenance system according to an embodiment, the apparatus can transmit the maintenance result indicating whether the maintenance succeeds or fails to the maintenance-data management center for every maintenance event and the maintenance-data management center can concurrently compile the successful events and the failed events to rapidly reflect the maintenance result in the maintenance data.

Since all the known failure data may be subjected to the centralized management and distributed to each apparatus in the apparatus maintenance system according to an embodiment, it is possible to rapidly reflect the statistical information about the actual failure data, the estimation result by the technical analysis, and the know-how of the maintenance operation. Accordingly, even in a failure concerning multiple parts in which it is difficult to identify a faulty part, the optimal maintenance operation can be presented on occurrence of the failure.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An apparatus maintenance system comprising:
an apparatus including a first control part, and a second control part connected to the first control part; and
a maintenance-data management server managing maintenance data about the apparatus,
wherein the first control part determines an error based on an error processing logic to obtain a maintenance result,
wherein the second control part downloads the maintenance data from the maintenance-data management server to transfer the downloaded maintenance data to the first control part, checks a validity of the maintenance result transferred from the first control part, and transmits the maintenance result to the maintenance-data management server.

2. The apparatus maintenance system according to claim 1, wherein the first control part generates a maintenance procedure on the basis of the transferred maintenance data.

3. The apparatus maintenance system according to claim 2, wherein the second control part analyzes a failure log of the apparatus to extract a failure history of each part in the apparatus in order to predict an occurrence of a failure of the part.

4. The apparatus maintenance system according to claim 3, further comprising:
a remote maintenance server including a known failure database storing known failure data received from the maintenance-data management server, the known failure data corresponds to a failure that is already known,
wherein, when a failure occurs in the apparatus, the apparatus notifies the remote maintenance server of the occurrence of the failure, and the remote maintenance server compares the failure that has occurred with the known failure data to determine whether the failure that has occurred is a known failure or an unknown failure.

5. The apparatus maintenance system according to claim 4, wherein the maintenance-data management server accesses a failure database that stores failure data connected to the maintenance-data management server.

6. A maintenance method for a system including an apparatus that includes a first control part and a second control part connected to the first control part and a maintenance-data management server that manages maintenance data about the apparatus, the method comprising:
downloading the maintenance data from the maintenance-data management server to transfer the downloaded maintenance data to the first control part from the second control part;
generating a maintenance procedure on the basis of the transferred maintenance data;
transferring a maintenance result to the second control part after the maintenance from the first control part, the first control part determining an error based on an error processing logic to obtain the maintenance result; and
transmitting the transferred maintenance result to the maintenance-data management server from the second control part, and
wherein the second control part executes said downloading and checks a validity of the maintenance result transferred from the first control part.

7. The maintenance method according to claim 6, further comprising:
analyzing a failure log of the apparatus to extract a failure history of each part in the apparatus in order to predict an occurrence of a failure of the part.

8. A maintenance method performed by a processor, comprising:
downloading maintenance data from a server;
transferring the maintenance data to a first controller from a second controller, the first controller determining an error based on an error processing logic to obtain a maintenance data;
generating a maintenance procedure on a basis of the transferred maintenance data;
transferring the maintenance result to the second controller after the maintenance from the first controller; and
transmitting the transferred result to the server from the second controller, and
wherein the second controller executes said downloading and checks a validity of the maintenance result transferred from the first controller.

* * * * *